(12) United States Patent
Sheridan et al.

(10) Patent No.: US 10,094,278 B2
(45) Date of Patent: Oct. 9, 2018

(54) TURBOFAN ENGINE BEARING AND GEARBOX ARRANGEMENT

(71) Applicant: United Technologies Corporation, Hartford, CT (US)

(72) Inventors: William G. Sheridan, Southington, CT (US); Frederick M. Schwarz, Glastonbury, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 299 days.

(21) Appl. No.: 14/892,103

(22) PCT Filed: May 6, 2014

(86) PCT No.: PCT/US2014/036941
§ 371 (c)(1),
(2) Date: Nov. 18, 2015

(87) PCT Pub. No.: WO2014/197155
PCT Pub. Date: Dec. 11, 2014

(65) Prior Publication Data
US 2016/0108808 A1   Apr. 21, 2016

Related U.S. Application Data

(60) Provisional application No. 61/830,275, filed on Jun. 3, 2013.

(51) Int. Cl.
*F02C 3/107* (2006.01)
*F16C 35/06* (2006.01)
(Continued)

(52) U.S. Cl.
CPC ............ *F02C 3/107* (2013.01); *F01D 25/162* (2013.01); *F02C 3/06* (2013.01); *F02C 7/06* (2013.01);
(Continued)

(58) Field of Classification Search
CPC .. F02C 3/1017; F02C 7/06; F02C 7/36; F02C 3/107; F05D 2260/40311; F05D 2240/52; F01D 25/162
See application file for complete search history.

(56) References Cited

U.S. PATENT DOCUMENTS 3,729,957 A * 5/1973 Petrie ...................... F01D 5/022
415/122.1
3,861,139 A * 1/1975 Jones ...................... F02C 3/067
60/226.1

(Continued)

FOREIGN PATENT DOCUMENTS

DE   3933776 A1   4/1991
EP   1921253 A2   5/2008

OTHER PUBLICATIONS

European Search Report dated Jan. 11, 2017 for EP Patent Application No. 14807172.3.
(Continued)

*Primary Examiner* — Carlos A Rivera
(74) *Attorney, Agent, or Firm* — Bachman & LaPointe, P.C.

(57) ABSTRACT

A turbofan engine (20) comprises a fan (28). A fan drive gear system (60) is configured to drive the fan. A low spool comprises a low pressure turbine (50) and a low shaft (56) coupling the low pressure turbine to the fan drive gear system. An intermediate spool comprises an intermediate pressure turbine (48), a compressor (42), and an intermediate spool shaft (54) coupling the intermediate pressure turbine to the intermediate spool compressor. A combustor
(Continued)

(45) is between a core spool compressor (44) and a high pressure turbine (46). A first (160) main bearing engages a static support (164; 164') and a forward hub (236) of the intermediate spool. A second (162) main bearing engages the low shaft and the forward hub.

20 Claims, 5 Drawing Sheets

(51) Int. Cl.

| | | |
|---|---|---|
| *F02C 7/06* | (2006.01) | |
| *F02C 7/36* | (2006.01) | |
| *F01D 25/16* | (2006.01) | |
| *F02C 3/06* | (2006.01) | |
| *F02K 3/06* | (2006.01) | |
| *F16C 19/26* | (2006.01) | |
| *F16C 19/54* | (2006.01) | |
| *F16C 19/55* | (2006.01) | |

(52) U.S. Cl.
CPC .................. *F02C 7/36* (2013.01); *F02K 3/06* (2013.01); *F16C 35/06* (2013.01); *F05D 2220/36* (2013.01); *F05D 2240/24* (2013.01); *F05D 2240/35* (2013.01); *F05D 2240/52* (2013.01); *F05D 2240/55* (2013.01); *F05D 2240/60* (2013.01); *F05D 2250/312* (2013.01); *F05D 2260/40311* (2013.01); *F16C 19/26* (2013.01); *F16C 19/545* (2013.01); *F16C 19/55* (2013.01); *F16C 2360/23* (2013.01)

(56) References Cited

U.S. PATENT DOCUMENTS

| | | | | |
|---|---|---|---|---|
| 3,903,690 | A * | 9/1975 | Jones | ...................... F02C 3/067 184/6.11 |
| 4,264,274 | A * | 4/1981 | Benedict | .................. F01D 11/08 415/126 |
| 4,916,894 | A * | 4/1990 | Adamson | ................ F02C 3/107 416/171 |
| 6,158,210 | A * | 12/2000 | Orlando | .................. F02C 3/067 60/226.1 |
| 6,464,401 | B1 | 10/2002 | Allard | |
| 7,299,621 | B2 * | 11/2007 | Bart | ...................... F01D 17/162 60/226.1 |
| 7,448,845 | B2 * | 11/2008 | Stephenson | ........... F01D 21/045 415/174.4 |
| 7,513,103 | B2 * | 4/2009 | Orlando | ................... F01D 1/26 60/226.1 |
| 7,716,914 | B2 * | 5/2010 | Schilling | ................. F02C 3/067 60/268 |
| 2001/0020361 | A1 * | 9/2001 | Udall | .................... F01D 21/045 60/226.1 |
| 2005/0198941 | A1 | 9/2005 | Bart et al. | |
| 2008/0098717 | A1 * | 5/2008 | Orlando | ................... F01D 1/24 60/226.1 |
| 2010/0205934 | A1 | 8/2010 | Gallet | |
| 2011/0056208 | A1 | 3/2011 | Norris et al. | |
| 2011/0123326 | A1 | 5/2011 | DiBenedetto et al. | |
| 2011/0206498 | A1 * | 8/2011 | McCooey | ............... F02C 3/107 415/124.1 |
| 2012/0251306 | A1 | 10/2012 | Reinhardt et al. | |
| 2012/0263578 | A1 | 10/2012 | Davis et al. | |
| 2012/0315130 | A1 | 12/2012 | Hasel et al. | |
| 2013/0025257 | A1 | 1/2013 | Suciu et al. | |
| 2013/0025258 | A1 | 1/2013 | Merry et al. | |

OTHER PUBLICATIONS

International Search Report and Written Opinion for PCT/US2014/036941, dated Sep. 4, 2014.

\* cited by examiner

TURBOFAN ENGINE BEARING AND GEARBOX ARRANGEMENT

CROSS-REFERENCE TO RELATED APPLICATION

Benefit is claimed of U.S. Patent Application Ser. No. 61/830,275, filed Jun. 3, 2013, and entitled "Turbofan Engine Bearing and Gearbox Arrangement", the disclosure of which is incorporated by reference herein in its entirety as if set forth at length.

BACKGROUND

The disclosure relates to turbofan engines. More particularly, the disclosure relates to main bearing arrangements for turbofan engines having gear reductions.

Gas turbine engines and similar structures feature a number of subassemblies mounted for rotation relative to a fixed case structure. Such engines have a number of main bearings reacting radial and/or thrust loads. Examples of such bearings are rolling element bearings such as ball bearings and roller bearings. Typically such bearings all react radial loads. Some such bearings also react axial (thrust) loads (either unidirectionally or bidirectionally). Ball bearings typically react thrust loads bidirectionally. However, if the inner race is configured to engage just one longitudinal side of the balls while the outer race engages the other longitudinal side, the ball bearing will react thrust unidirectionally.

Tapered roller bearings typically react thrust unidirectionally. Two oppositely-directed tapered roller bearings may be paired or "duplexed" to react thrust bidirectionally. An example is found in the fan shaft bearings of U.S. Patent Application Publication 2011/0123326A1. Another configuration is found in US Patent Application Publication 2012/0315130A1. US Patent Application Publications 2013/0025257A1 and 2013/0025258A1 disclose so-called three-spool engines wherein a high pressure spool comprises a high pressure compressor (HPC) and a high pressure turbine (HPT) respectively upstream of and downstream of a combustor. An intermediate spool comprises an intermediate pressure compressor (IPC) upstream of the HPC and an intermediate pressure turbine (IPT) downstream of the HPT. A low spool comprises a low pressure turbine (LPT) downstream of the IPT and driving the fan via a fan drive gear system. The exemplary low spool comprises only the LPT and associated shaft assembly and does not include any compressor stages.

Unless explicitly or implicitly indicated otherwise, the term "bearing" designates an entire bearing system (e.g., inner race, outer race and a circumferential array of rolling elements) rather than the individual rolling elements. The term "main bearing" designates a bearing used in a gas turbine engine to support the primary rotating structures within the engine that produce thrust. This is distinguished, for example, from an accessory bearing (which is a bearing that supports rotating structures that do not produce thrust such as the fuel pump or oil pump bearings in an accessory gearbox).

SUMMARY

One aspect of the disclosure involves a turbofan engine comprising a fan. A fan drive gear system is configured to drive the fan. A low spool comprises a low pressure turbine and a low shaft coupling the low pressure turbine to the fan drive gear system. An intermediate spool comprises an intermediate pressure turbine, a compressor, and an intermediate spool shaft coupling the intermediate pressure turbine to the intermediate spool compressor. A core spool comprises a high pressure turbine, a compressor, and a core shaft coupling the high pressure turbine to the core shaft. A combustor is between the core spool compressor and the high pressure turbine. The engine has a plurality of main bearings. A first of said main bearings engages a static support and a forward hub of the intermediate spool. A second of said main bearings engages the low shaft and the forward hub of the intermediate spool.

A further embodiment may additionally and/or alternatively include the forward hub extending forward from a disk of the intermediate spool compressor.

A further embodiment may additionally and/or alternatively include the forward hub extending forward from a bore of the disk of the intermediate spool compressor.

A further embodiment may additionally and/or alternatively include the intermediate spool compressor having at least one disk forward of said disk.

A further embodiment may additionally and/or alternatively include the static support passing through said at least one disk forward of said disk.

A further embodiment may additionally and/or alternatively include the intermediate spool compressor having at least two disks forward of said disk.

A further embodiment may additionally and/or alternatively include said at least one disk being forward of a centerplane of the second bearing.

A further embodiment may additionally and/or alternatively include the first bearing and the second bearing being non-thrust roller bearings.

A further embodiment may additionally and/or alternatively include rollers of the first bearing and the second bearing being at least partially longitudinally overlapping.

A further embodiment may additionally and/or alternatively include a separation of a transverse centerplane of the first bearing and a transverse centerplane of the second bearing being less than a radius ($R_B$) of the first bearing.

A further embodiment may additionally and/or alternatively include a first seal sealing the first bearing and a second seal sealing the second bearing to isolate a transmission compartment ahead of the first bearing and the second bearing from a region behind the first bearing and the second bearing.

A further embodiment may additionally and/or alternatively include the fan drive gear system comprising: a sun gear mounted to rotate with the low shaft; a ring gear mounted to rotate with the fan; a plurality of intermediate gears between the sun gear and the ring gear; and a carrier holding the intermediate gears.

A further embodiment may additionally and/or alternatively include a third of said main bearings being a thrust bearing engaging the low shaft.

A further embodiment may additionally and/or alternatively include a fourth of said main bearings being a non-thrust roller bearings bearing engaging an aft end of the low shaft.

A further embodiment may additionally and/or alternatively include the core shaft engaging at least two of said main bearings, and wherein at least one of said at least two of said main bearings is a thrust bearing.

A further embodiment may additionally and/or alternatively include the low pressure turbine having three to five blade stages.

A further embodiment may additionally and/or alternatively include the intermediate spool shaft engaging at least two of said main bearings, and wherein at least one of said at least two of said main bearings is a thrust bearing.

A further embodiment may additionally and/or alternatively include an inter-shaft bearing axially locating the low shaft.

A further embodiment may additionally and/or alternatively include the low shaft engaging at least three of said main bearings.

A further embodiment may additionally and/or alternatively include the fan being a single-stage fan.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
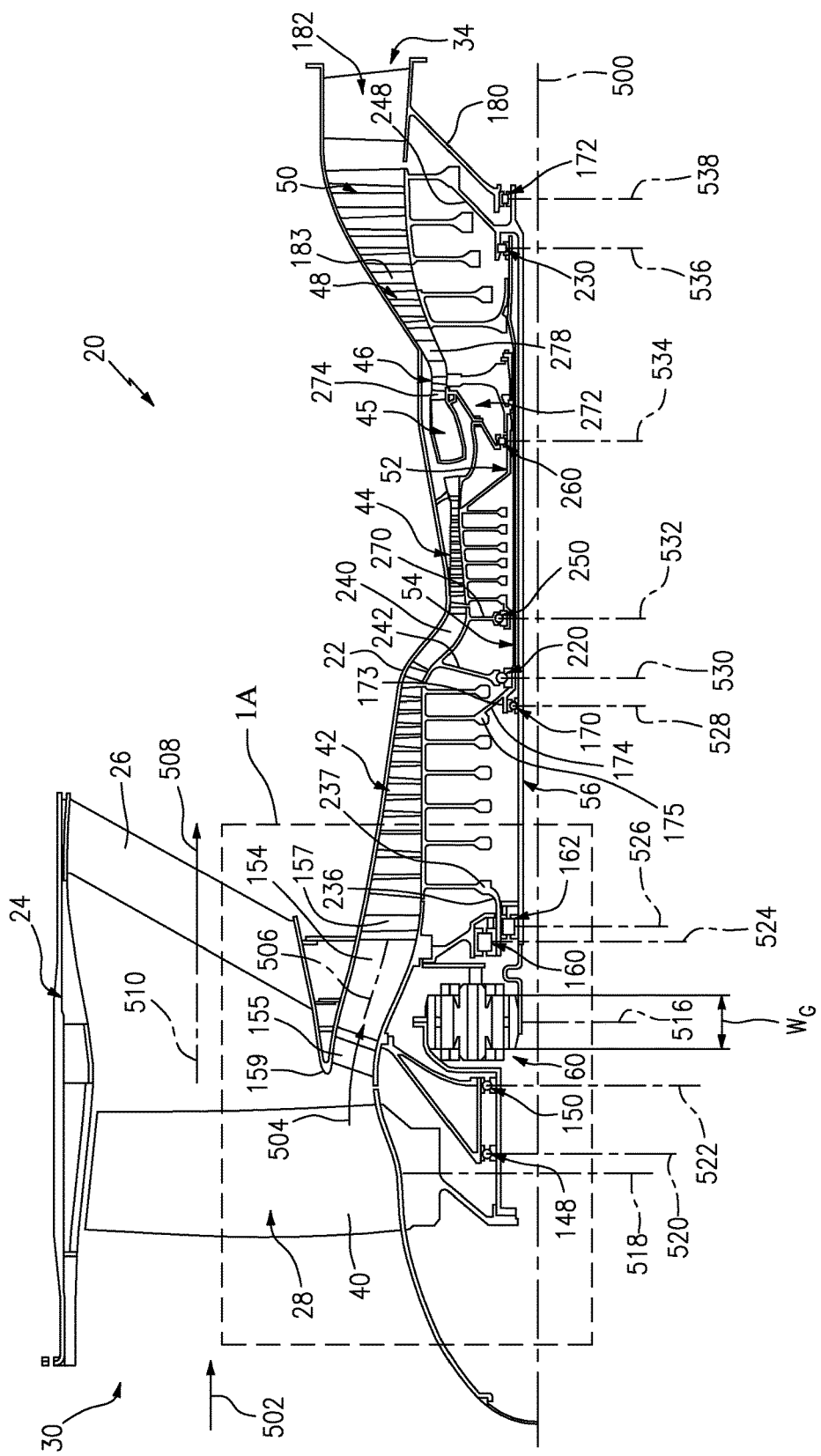
FIG. 1 is a schematic longitudinal sectional view of a first turbofan engine embodiment.

FIG. 1 shows a turbofan engine 20. The exemplary engine 20 reflects modifications of a baseline engine illustrated in US Patent Application Publication 2012/0315130A1. Other embodiments may reflect other modifications of that baseline engine or other baseline engines or may represent clean-sheet designs.

FIG. 1 shows a turbofan engine 20 having a central longitudinal axis or centerline 500. The engine has a structural case including a core case 22. The exemplary structural case further comprises a fan case 24 connected to the core case by a circumferential array of struts 26 and surrounding a fan 28. The core case and the fan case may have respective outboard aerodynamic nacelles (not shown).

The exemplary forward rim of the fan case is proximate an engine inlet 30 receiving an inlet flow 502 when the engine is operating. The inlet flow passes downstream through the fan 28 and divides into a core flow 504 passing inboard along a core flowpath 506 within the core case and a bypass flow 508 passing outboard along a bypass flowpath 510 between the core case 22 and the fan case 24.

The core flow 504 (or a majority portion thereof allowing for bleeds, etc.) passes sequentially through one or more compressor sections, a combustor, and one or more turbine sections before exiting a core outlet 34. In the exemplary engine the fan is a single-stage fan having a single stage of fan blades 40. Each of the compressor and turbine sections may include one or more blade stages mounted to rotate as a unit about the centerline 500. The blade stages may be alternatingly interspersed with vane stages. Each compressor section is co-spooled with an associated turbine section. From upstream to downstream along the core flowpath, the exemplary engine has two compressor sections 42 and 44, the combustor 45, and three turbine sections 46, 48, and 50. The fan and compressor sections (and their stages) progressively compress inlet air which passes into the combustor for combustion with fuel to generate high pressure gas which passes downstream through the turbine sections where the gas pressure is progressively reduced as work is extracted. The turbine section 46 operates at highest pressure and is often referred to as a high pressure turbine (HPT) or a core turbine. The HPT blade stages are connected via a shaft 52 ("high shaft" or "core shaft") to the blade stages of the compressor section 44 to drive that compressor section (often referred to as a high pressure compressor (HPC) or core compressor) to form a high spool or core spool.

The turbine section 48 operates at an intermediate pressure range and is thus often referred to as an intermediate pressure turbine (IPT). The IPT blade stages are connected via a shaft 54 ("intermediate shaft") to the compressor section 42 to drive that compressor section (often referred to as an intermediate pressure compressor (IPC)) to form an intermediate spool.

The turbine section 50 operates at a low pressure range and is thus often referred to as a low pressure turbine (LPT). The LPT blade stages are connected via a shaft 56 ("low shaft") to a transmission 60 (e.g., an epicyclic transmission, more particularly a geared system known as a fan drive gear system (FDGS)) to indirectly drive the fan 28 with a speed reduction.

An exemplary high pressure turbine 46 is a single or double stage turbine assembly; an exemplary intermediate stage turbine 48 is a single or double stage turbine assembly; an exemplary low pressure turbine 50 is a multi-stage turbine (e.g., three or more or an exemplary three to five).

The exemplary transmission 60 (FIG. 1A) comprises a central externally-toothed sun gear 80. The sun gear 80 is encircled by an internally-toothed ring gear 82. A number of externally-toothed star or planet gears 84 are positioned between and enmeshed with the sun gear 80 and ring gear 82. The star or planet gears 84 can be referred to as intermediate gears. A cage or carrier assembly 86 carries the intermediate gears via associated bearings 88 for rotation about respective bearing axes. The exemplary bearings 88 may be rolling element bearings or may be journal bearings having external circumferential surface portions closely accommodated within internal bore surfaces of the associated intermediate gears 84.

The exemplary carrier assembly 86 comprises a front plate (e.g., annular) in front of the gears and a rear plate (e.g., annular) behind the gears. These plates may be mechanically connected by the bearings 88 and/or by linking portions between adjacent intermediate gears.

In the exemplary embodiment, a forward end of the low shaft 56 is coupled to the sun gear 80. The exemplary low shaft 56 has a generally rigid main portion 100 and a flexible forward portion 102. A forward end of the portion 102 may have a splined outer diameter (OD) surface interfitting with a splined inner diameter (ID) surface of the sun gear 80 to transmit rotation.

The exemplary carrier assembly 86 is substantially non-rotatably mounted relative to the engine case 22. In the exemplary embodiment, the carrier assembly 86 is coupled to the case 22 via a compliant flexure 110 that allows at least small temporary radial and axial excursions and rotational excursions transverse to the centerline 500. The exemplary flexure 110 carries a circumferential array of fingers 111 engaging the carrier 86 (e.g., between adjacent gears 84). A peripheral portion of the flexure 110 is mounted to the case to resist rotation about the centerline 500. Thus, flexing of the flexure accommodates the small excursions mentioned above while holding the carrier against rotation about the centerline.

The exemplary ring 82 is coupled to the fan 28 to rotate with the fan 28 as a unit. In the exemplary embodiment a rear hub 122 of a main fan shaft 120 connects the fan 28 to the ring gear 82.

The speed reduction ratio is determined by the ratio of diameters of the ring gear 82 to the sun gear 80. This ratio will substantially determine the maximum number of intermediate gears 84 in a given ring. The actual number of intermediate gears 84 will be determined by stability and stress/load sharing considerations. An exemplary reduction is between about 2:1 and about 13:1. Although only one intermediate gear 84 is necessary, in exemplary embodiments, the number of intermediate gears 84 may be between about three and about eleven. An exemplary gear layout with fixed carrier is found in U.S. Patent Application Publication 2012/0251306A1.

Thus, the exemplary engine 20 has four main rotating components (units) rotating about the centerline 500: the core spool (including the high pressure turbine 46, the high shaft 52, and the high pressure compressor 44); the intermediate spool (including the intermediate pressure turbine 48, the intermediate shaft 54, and the intermediate pressure compressor 42); the low spool (including the low pressure turbine 50 and low shaft 56); and the fan assembly (including the fan 28 itself and the fan shaft 120). Each of these four things needs to be supported against: radial movement; overturning rotations transverse to the centerline 500; and thrust loads (parallel to the centerline 500). Radial and overturning movements are prevented by providing at least two main bearings engaging each of the four units.

Each unit would have to also engage at least one thrust bearing. The nature of thrust loads applied to each unit will differ. Accordingly, the properties of required thrust bearings may differ. For example, the fan 28 primarily experiences forward thrust and, therefore, the thrust bearings engaging the fan 28 may be configured to address forward thrust but need not necessarily address rearward thrusts of similar magnitudes, durations, etc.

The FIG. 1 embodiment has two main bearings 148, 150 along the fan shaft forward of the transmission 60. Inboard, the inner race of each bearing 148, 150 engages a forward portion of the shaft 120 aft of the fan 28. Outboard, the outer race of each bearing 148, 150 engages static structure of the case. The exemplary static structure comprises a support 152 extending inward and forward from a forward frame 154. These two bearings 148, 150 thus prevent radial excursions and overturning moments which the fan 28 may produce during flight.

To resist thrust loads, one or both of the bearings 148, 150 may be thrust bearings. In an exemplary embodiment, both are thrust bearings (schematically shown as ball bearings). Both may be thrust bearings because there may typically be no differential thermal loading (and thus thermal expansion) of the support 152 relative to the shaft 120 between these bearings. Where the two coupled structures are subject to differences in thermal expansion, it may be desirable to have only one bearing be a thrust bearing.

In one alternative example of a single thrust bearing and a single non-thrust bearing, the bearing 150 would be a straight roller bearing with longitudinal roller axes configured to only handle radial loads. The other bearing (i.e., the bearing 148) would be a thrust bearing. Due to the significance of forward thrust loads on the fan 28, the bearing 148 may be biased to resist forward loads. The exemplary bearing 148 may then be a bidirectional ball bearing or a bidirectional tapered roller bearing (e.g., wherein the rollers have a forward taper and forwardly converging roller axes to preferentially handle the forward thrust loads). A similar bidirectional tapered roller bearing is shown in U.S. Pat. No. 6,464,401 of Allard. Ball bearings are typically bidirectional thrust bearings. However, a unidirectional ball bearing may be formed by having at least one of the races contacting only a single longitudinal side of the balls.

An exemplary bearing arrangement for supporting the remaining three units is discussed below. Various aspects of each of these may be independently implemented or all may be implemented in a given engine.

The exemplary low shaft 56 is principally radially supported by a forward bearing 162, an intermediate bearing 170, and an aft bearing 172. The exemplary forward bearing 162 is indirectly radially grounded to the case 22. An exemplary indirect grounding (discussed further below) is via the intermediate spool and bearing 160. The exemplary bearing 160 (FIG. 1A) is directly radially grounded to the case (e.g., by a bearing support 164 extending inward from a frame 154 aft of the support 152). FIG. 1 also shows an inlet guide vane array 155 immediately upstream of the struts of the frame 154 and an outlet guide vane array 157 immediately downstream of the frame 154 and upstream of the leading compressor stage. In exemplary implementations, the vanes of the array 157 may be variable vanes. The exemplary array 155 is immediately downstream of a splitter 159 dividing the core flowpath from the bypass flowpath.

The exemplary bearing 170 intervenes directly between the low spool and high spool at an intermediate location. In the exemplary embodiment, it is indirectly radially grounded by the bearing 220. The bearing 220 is directly radially grounded by a support 240 extending radially inward from a structural vane array (frame) 242 between the compressor sections 42 and 44.

The exemplary aft bearing 172 is directly radially grounded to the case 22 via a support 180 extending inward from a frame 182 extending across the core flowpath 504. The exemplary support 180 is aft of the LPT 50 with the frame 182 being a turbine exhaust frame. Alternative implementations may shift the support 180 forward of the LPT 50 to engage an inter-turbine frame 183 between the turbine sections 48 and 50.

In the exemplary embodiment, the bearings 162 and 172 are non-thrust roller bearings (e.g., straight roller bearings). The bearing 170 serves as inter-shaft thrust bearing (e.g., a bidirectional ball bearing) having an inner race engaging an intermediate portion of the low shaft 56 and an outer race engaging the intermediate shaft 54 to indirectly axially ground the low shaft 56 to the case 22 via the intermediate shaft 54.

By locating the bearing 170 relatively axially close to the bearing 220, the bearing 170 may also provide an intermediate location of radial grounding in addition to the forward and aft radial groundings provided by the bearings 162 and 172. Alternative implementations might eliminate or reduce the amount of this radial grounding. In the FIG. 1 example, the bearings 160 and 162 are stacked so close as to be partially axially overlapping (i.e., axial overlap of their rollers) to provide a high degree of radial support.

In contrast, there is a slight non-overlap forward shift of the bearing 170 relative to the bearing 220. In the exemplary engine, the outer race of the bearing 170 engages a forwardly-projecting support extending forward from a rear hub 174 of the compressor section 42. The exemplary rear hub 174 extends from a bore 175 of one of the disks of the compressor section 42. Slight flexing of the hub 174 and the outer bearing support 173 protruding therefrom may provide a little more radial compliance than associated with the forward bearing 162.

The intermediate spool is supported by forward bearing 160, an intermediate bearing 220, and an aft bearing 230. In an exemplary embodiment, forward bearing 160 is a non-thrust roller bearing providing radial retention only. The inner race of the bearing 160 (and outer race of the bearing 162) are mounted along respective outer and inner faces of a hub or support 236 extending forward from the bore 237 of one of the disks of the compressor section 42 (e.g., the first (upstream-most) disk). The exemplary intermediate bearing 220 is a bidirectional thrust bearing (e.g., ball bearing) directly radially and axially supporting/grounding the intermediate spool via the support 240 extending to the inter-compressor frame 242 between the compressor sections 42 and 44. The bearing 230 indirectly radially supports/grounds the intermediate spool by engaging the intermediate spool and the low spool. In the exemplary embodiment, the inner race of the bearing 230 engages a portion of the intermediate shaft aft of the turbine section 48 and the outer race of the bearing 230 engages a support extending forward from a hub 248 of the LPT 50. The exemplary hub 248 extends forward from the bore of a disk (e.g., the last or downstream-most disk) of the LPT.

The radial loads on the intermediate spool at the bearing 230 will primarily be transmitted to the low shaft 56 and through an aft portion of the low shaft 56 to the bearing 172 and grounded by the support 180 and frame 182. Axial (thrust) loads will pass through the bearing 220.

Thus, thrust loads on the low spool are transmitted via the shaft 56 through the bearing 170, through the intervening portion of the intermediate shaft/spool, to the bearing 220, and grounded back through the support 240.

The core spool may be fully directly supported by two bearings 250 and 260 of which at least one would be a thrust bearing. In the exemplary embodiment, the bearing 250 is a forward bearing grounding a forward portion of the core shaft ahead of the compressor section 44 to the inter-compressor frame 242 via a support 270. The aft bearing 260 grounds a portion of the core shaft intermediate the compressor section 44 and turbine section 46 via a support 272 extending to a combustor frame 274 ahead of the turbine section 46. In alternative embodiments, this aft bearing 260 may be shifted aft of the turbine section 46 via a support (not shown) to an inter-turbine frame 278 between the sections 46 and 48. In the exemplary implementation, the bearing 250 is a thrust bearing (e.g., a bidirectional ball bearing with its inner race engaging the core spool and its outer race engaging the support 270). The exemplary bearing 260 is a straight roller bearing with its inner race engaging the core shaft 52 and its outer race engaging the support 272. The exemplary support 270 extends to a rear portion of the frame 240 aft of the support 242. The exemplary inner race of the bearing 250 is mounted to a hub or support extending forward from a bore of a disk (e.g., the upstream-most disk) of the compressor section 44.

FIG. 1 further shows the transmission 60 as having a centerplane 516 and the gears as having a gear width $W_G$ and the fan blade array as having a centerplane 518. From fore to aft, the bearings have respective centerplanes 520, 522, 524, 526, 528, 530, 532, 534, 536, and 538.

As discussed above, an exemplary embodiment places the centerplanes 524 and 526 of the bearings 160 and 162 relatively close to each other so as to best transmit radial loads from the low shaft 56 to the case. An exemplary separation between the planes 524 and 526 (FIG. 1A) in such embodiments is less than the characteristic radius of the bearing 160 (e.g., radius $R_B$ relative to the axis 500 of the intersections of the individual rolling element axes with the bearing centerplane). In contrast, the exemplary embodiment has a greater separation between the centerplanes 528 and 530 of the bearings 170 and 220. This may provide a greater radial compliance at the associated intermediate location.

Figure 1A:
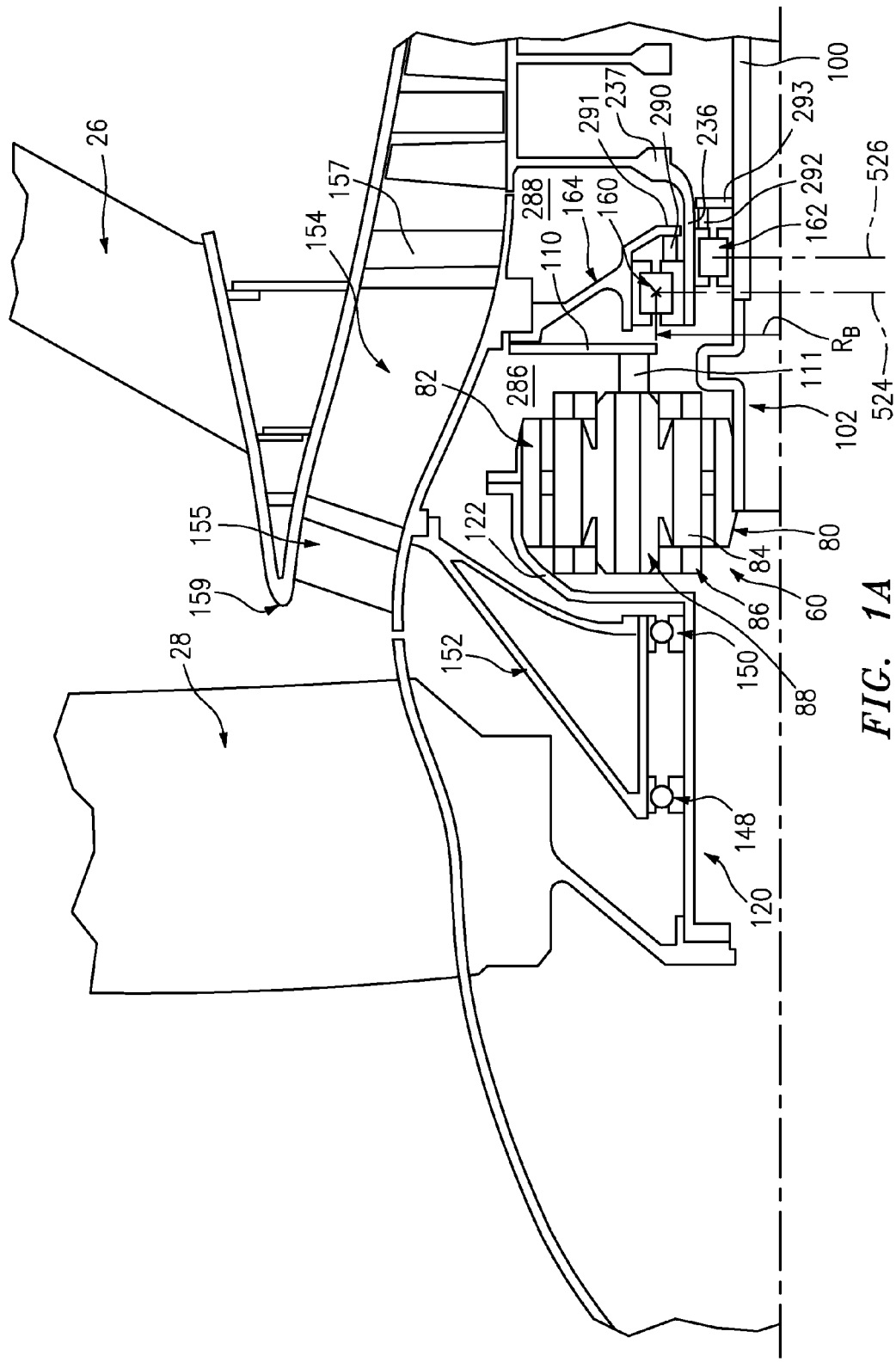
FIG. 1A is an enlarged view of a forward portion of the engine of FIG. 1.

FIG. 1A further shows a transmission compartment 286 containing the transmission 60. Aftward, the transmission compartment is largely bounded by the support 164 and bearings 160 and 162. Seals may be provided to seal the transmission compartment 286 from a region 288 (e.g., a compressor compartment) aft thereof. The exemplary seals comprise an outer seal 290 sealing between the static structure and the intermediate spool and an inner seal 292 sealing between the intermediate spool and the low spool. Exemplary seal 290 is held by a carrier 291. An exemplary carrier 291 is formed as an inward and aftward extension of the support 164 holding the seal 290 in sliding/sealing engagement with the low spool (e.g., with an inner race of the bearing 160). Similarly, a seal carrier 293 carries the exemplary seal 292. In the exemplary embodiment, the seal carrier 293 is mounted to or formed as a portion of the low shaft main portion 100 holding the seal 292 in sealing and sliding engagement with the intermediate spool (e.g., with an outer race of the bearing 162). In alternative implementations, the carrier and seal elements of one or both of the sealing systems may be reversed (e.g., the seal carrier 293 could be formed as a portion of the hub 236 holding the seal 292 in sliding/sealing engagement with the low spool).

Figure 2:
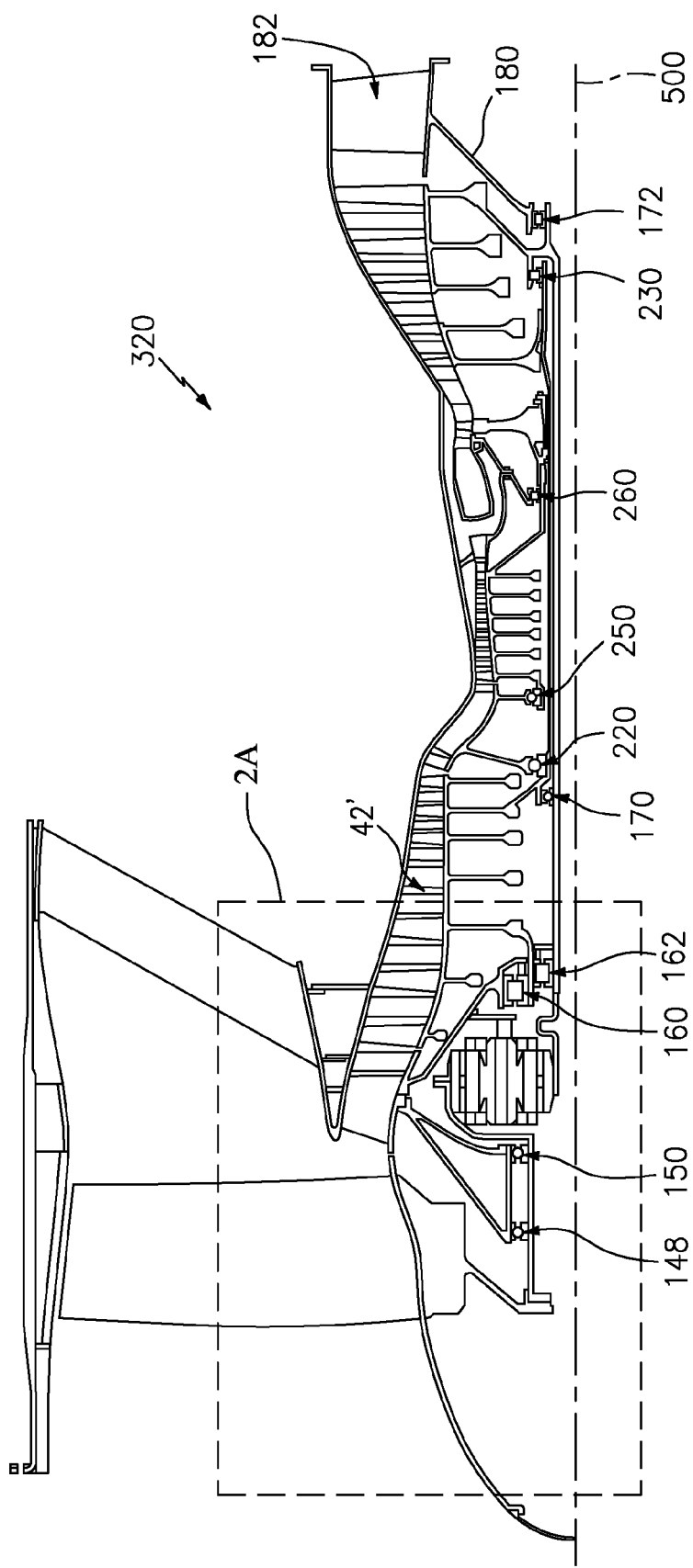
FIG. 2 is a schematic longitudinal sectional view of a second turbofan engine embodiment.

FIG. 2 shows an alternate embodiment 320 which may be otherwise similar to the engine 20 but which has a forward shift of its compressor section 42' relative to the compressor section 42 of FIG. 1. The exemplary forward shift may be achieved by having the hub or support structure 236 that cooperates with the bearings 160 and 162 extend forward from the bore 237' of an intermediate disk of the compressor section 42' in distinction to the extension from the upstream-most disk of the compressor section 42. In the exemplary engine 320, the hub 236 extends from the third disk leaving two disks and their associated blade stages thereahead. The exemplary shift shifts at least one disk stage forward of the bearings 160 and/or 162. In this example, the longitudinal position of the first disk (e.g., measured by the centerplane of its web and/or bore) is shifted ahead of the centerplanes of the bearings 160 and 162. An exemplary shift places the first disk ahead of both bearings 160 and 162 and the second disk ahead of only the bearing 162. However, other locations and combinations are possible.

Figure 2A:
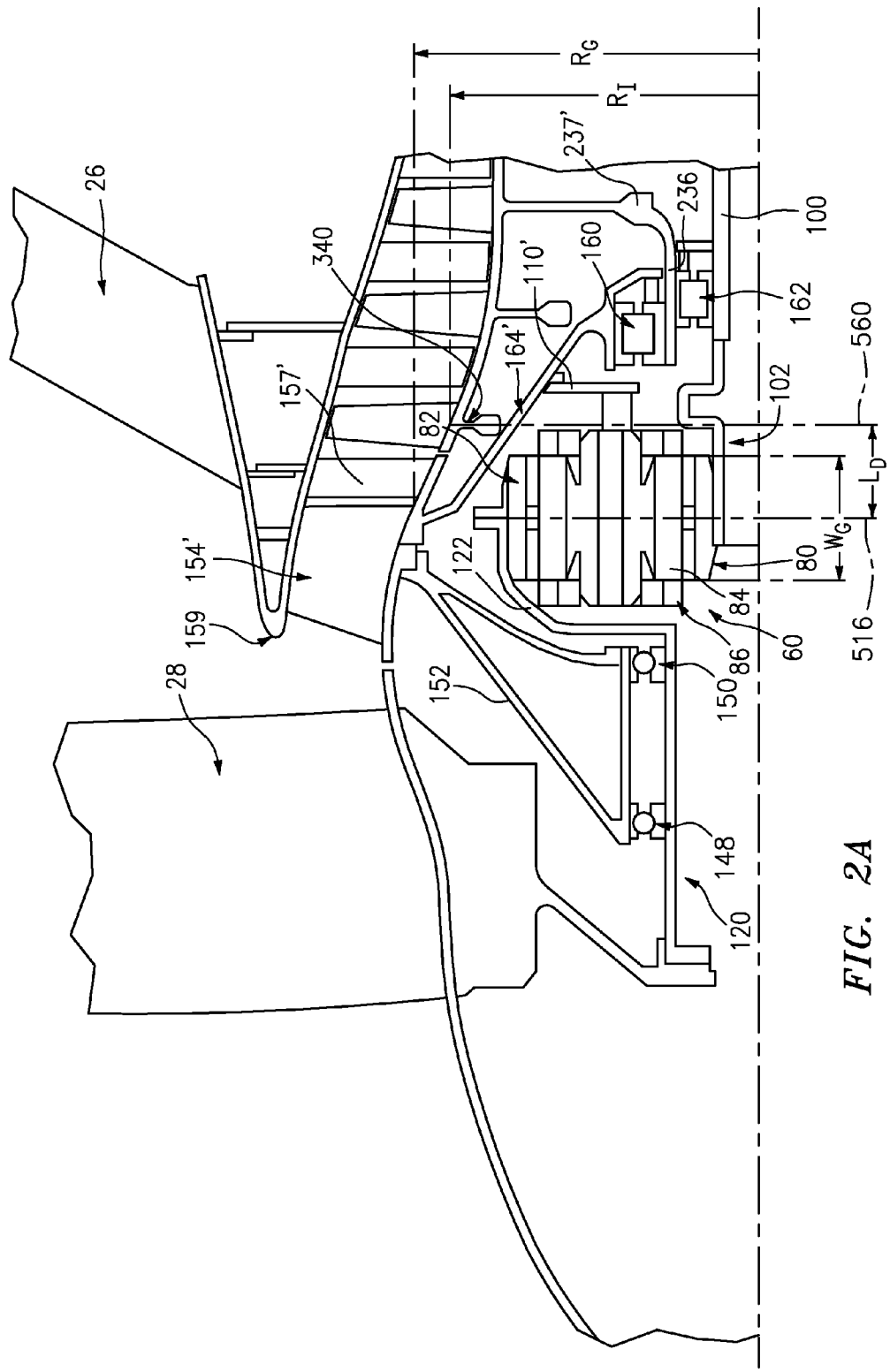
FIG. 2A is an enlarged view of a forward portion of the engine of FIG. 2.

A further characterization of the longitudinal compactness involves the relationship between the first disk and the transmission. FIG. 2A shows a centerplane 560 of the first disk 340. The centerplane 560 is behind the gear centerplane 516 by a length $L_D$. Exemplary $L_D$ is 2.0 times the gear width $W_G$ or less, more particularly, 1.5 times $W_G$ or less. Alternatively characterized, exemplary $L_D$ is 60% or less of the core flowpath inboard radius $R_I$ at the disk centerplane 560, more particularly, 50% or less or 35% or less of $R_I$.

Yet alternatively characterized relative to such a core flowpath inboard radius $R_G$ at the gear centerplane 516, exemplary $L_D$ is 50% of $R_G$ or less, more particularly, 40% or less or 30% or less.

To further facilitate longitudinal compactness, relative to the engine 20, the engine 320 axially shrinks the frame 154' relative to the frame 150. In this example, the frame 154' and its associated struts replace both the frame 154 and its associated struts and the inlet guide vane array 155 (FIG. 1A). The guide vane array 157 (FIG. 1A) downstream of the struts is effectively shifted forward to become 157'. Along with the foreshortening of the frame 154', the outboard periphery and mounting location of the support 164 is shifted forward and outward to become 164'. Thus, the exemplary support 164' is shallower than support 164 and partially overarches the span of the transmission gears. Because of this overarching, the fingered flexure 110 is shifted to be mounted to a mounting feature (e.g., flange) 110' along the support 164'.

Figure 3:
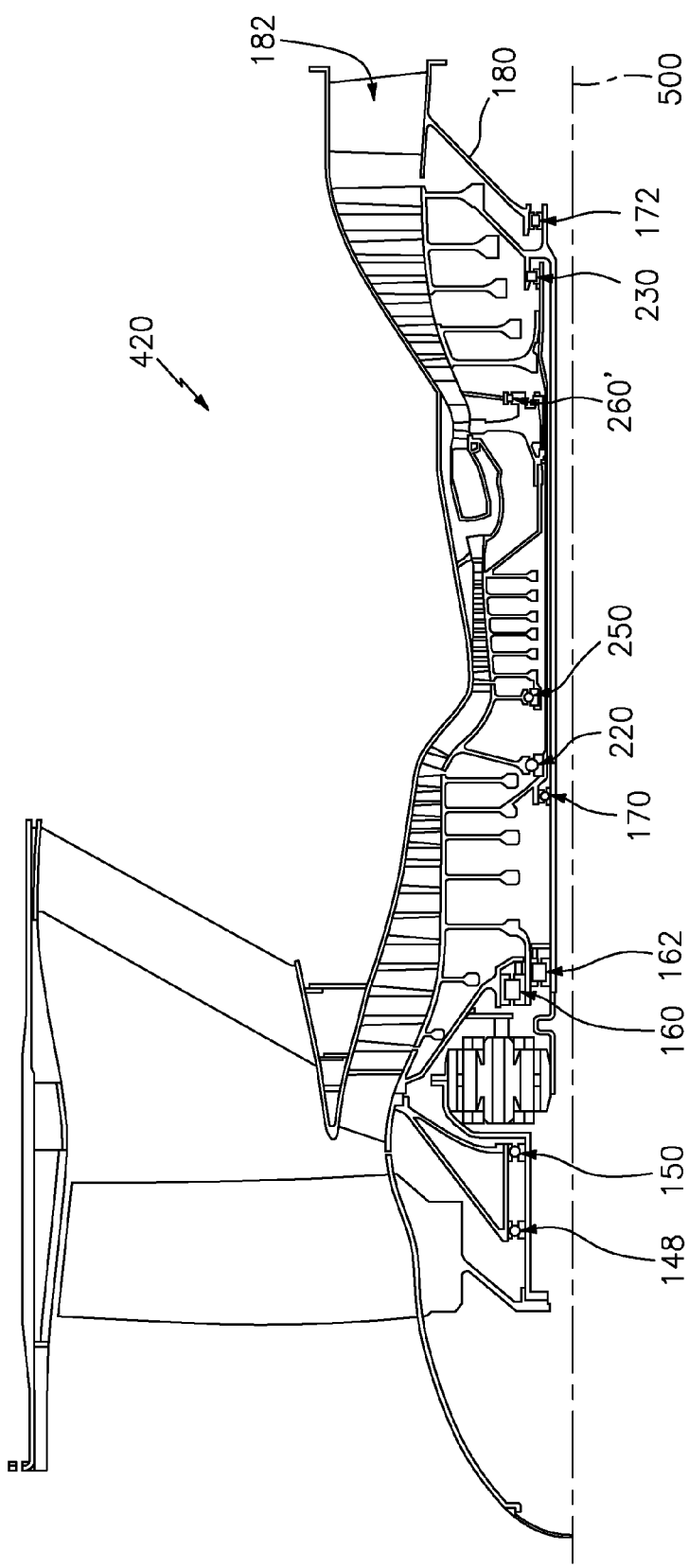
FIG. 3 is a schematic longitudinal sectional view of a third turbofan engine embodiment.

FIG. 3 shows yet a further embodiment 420 reflecting the variation discussed above wherein the bearing 260 is shifted aft of the high pressure turbine section 46. Other variations might add a second intermediate spool. Other variations include unducted fans. Other variations include multi-stage fans.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic configuration, details of such configuration or its associated environment may influence details of particular implementations. Accordingly, other embodiments are within the scope of the following claims.

What is claimed is:

1. A turbofan engine (20) comprising:
   a single-stage fan (28);
   a fan drive gear system (60) configured to drive the fan;
   a low spool comprising:
      a low pressure turbine (50); and
      a low shaft (56) coupling the low pressure turbine to the fan drive gear system;
   an intermediate spool comprising;
      an intermediate pressure turbine (48);
      a compressor (42); and
      an intermediate spool shaft (54) coupling the intermediate pressure turbine to the intermediate spool compressor;
   a core spool comprising:
      a high pressure turbine (46);
      a compressor (44); and
      a core shaft (52) coupling the high pressure turbine to the core spool compressor;
   a combustor (45) between the core spool compressor and the high pressure turbine; and
   a plurality of main bearings,
   wherein:
      the fan drive gear system comprises:
         a sun gear (80) mounted to rotate with the low shaft;
         a ring gear (82) mounted to rotate with the fan;
         a plurality of intermediate gears (84) between the sun gear and the ring gear; and
         a carrier (86) holding the intermediate gears;
      a first (160) of said plurality of main bearings engages a static support (164; 164') and a forward hub (236) of the intermediate spool; and
      a second (162) of said plurality of main bearings engages the low shaft and the forward hub of the intermediate spool.

2. The engine of claim 1 wherein:
the forward hub extends forward from a disk of the intermediate spool compressor.

3. The engine of claim 2 wherein:
the forward hub extends forward from a bore (237) of the disk of the intermediate spool compressor.

4. The engine of claim 2 wherein:
the intermediate spool compressor has at least one disk forward of said disk.

5. The engine of claim 4 wherein:
the static support (164') passes through said at least one disk forward of said disk.

6. The engine of claim 4 wherein:
the intermediate spool compressor has at least two disks forward of said disk.

7. The engine of claim 4 wherein:
said at least one disk is forward of a centerplane (526) of the second bearing.

8. The engine of claim 1 wherein:
a separation of a transverse centerplane (524) of the first bearing and a transverse centerplane (526) of the second bearing is less than a radius ($R_B$) of the first bearing.

9. The engine of claim 1 wherein:
a first seal (290) seals the first bearing and a second seal (292) seals the second bearing to isolate a transmission compartment (286) ahead of the first bearing and the second bearing from a region (288) behind the first bearing and the second bearing.

10. The engine of claim 1 wherein:
a third of said plurality of main bearings is a thrust bearing (170) engaging the low shaft.

11. The engine of claim 10 wherein:
a fourth of said plurality of main bearings is a non-thrust roller bearings bearing (172) engaging an aft end of the low shaft.

12. The engine of claim 1 wherein:
the core shaft engages at least two of said plurality of main bearings, and wherein at least one of said at least two of said main bearings is a thrust bearing.

13. The engine of claim 1 wherein:
the low pressure turbine has three to five blade stages.

14. The engine of claim 1 wherein:
the intermediate spool shaft engages at least two of said plurality of main bearings, and wherein at least one of said at least two of said main bearings is a thrust bearing.

15. The engine of claim 1 wherein:
an inter-shaft bearing (170) axially locates the low shaft.

16. The engine of claim 1 wherein:
the low shaft engages at least three of said plurality of main bearings.

17. A turbofan engine (20) comprising:
a fan (28);
a fan drive gear system (60) configured to drive the fan;
a low spool comprising:
   a low pressure turbine (50); and
   a low shaft (56) coupling the low pressure turbine to the fan drive gear system;
an intermediate spool comprising;
   an intermediate pressure turbine (48);
   a compressor (42); and
   an intermediate spool shaft (54) coupling the intermediate pressure turbine to the intermediate spool compressor;

a core spool comprising:
  a high pressure turbine (46);
  a compressor (44); and
  a core shaft (52) coupling the high pressure turbine to the core shaft;
a combustor (45) between the core spool compressor and the high pressure turbine; and
a plurality of main bearings wherein:
  a first (160) of said main bearings engages a static support (164; 164') and a forward hub (236) of the intermediate spool; and
  a second (162) of said main bearings engages the low shaft and the forward hub of the intermediate spool;
  the first bearing and the second bearing are non-thrust roller bearings; and
  rollers of the first bearing and the second bearing are at least partially longitudinally overlapping.

18. The engine of claim 17 wherein:
a first seal (290) seals the first bearing and a second seal (292) seals the second bearing to isolate a transmission compartment (286) ahead of the first bearing and the second bearing from a region (288) behind the first bearing and the second bearing.

19. A turbofan engine (20) comprising:
a fan (28);
a fan drive gear system (60) configured to drive the fan;
a low spool comprising:
  a low pressure turbine (50); and
  a low shaft (56) coupling the low pressure turbine to the fan drive gear system;
an intermediate spool comprising;
  an intermediate pressure turbine (48);
  a compressor (42); and
  an intermediate spool shaft (54) coupling the intermediate pressure turbine to the intermediate spool compressor;
a core spool comprising:
  a high pressure turbine (46);
  a compressor (44); and
  a core shaft (52) coupling the high pressure turbine to the core spool compressor;
a combustor (45) between the core spool compressor and the high pressure turbine; and
a plurality of main bearings wherein:
  a first (160) of said plurality of main bearings engages a static support (164; 164') and a forward hub (236) of the intermediate spool;
  a second (162) of said plurality of main bearings engages the low shaft and the forward hub of the intermediate spool; and
  an inter-shaft bearing (170) of said plurality of main bearings axially locates the low shaft.

20. The engine of claim 19 wherein:
a first seal (290) seals the first bearing and a second seal (292) seals the second bearing to isolate a transmission compartment (286) ahead of the first bearing and the second bearing from a region (288) behind the first bearing and the second bearing.

\* \* \* \* \*